US010269471B2

(12) United States Patent
Soerensen

(10) Patent No.: US 10,269,471 B2
(45) Date of Patent: Apr. 23, 2019

(54) METHOD AND APPARATUS FOR PRODUCING A SUBMARINE CABLE, AND SUBMARINE CABLE PRODUCED THEREWITH

(71) Applicant: SIEMENS AKTIENGESELLSCHAFT, München (DE)

(72) Inventor: Johnny Soerensen, Videbæk (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 0 days.

(21) Appl. No.: 15/108,698

(22) PCT Filed: Feb. 3, 2015

(86) PCT No.: PCT/EP2015/052168
§ 371 (c)(1),
(2) Date: Jun. 28, 2016

(87) PCT Pub. No.: WO2015/124418
PCT Pub. Date: Aug. 27, 2015

(65) Prior Publication Data
US 2016/0358697 A1     Dec. 8, 2016

(30) Foreign Application Priority Data

Feb. 24, 2014   (DE) .................. 10 2014 203 223

(51) Int. Cl.
*H02G 15/04*     (2006.01)
*H01B 13/22*     (2006.01)
(Continued)

(52) U.S. Cl.
CPC .......... *H01B 13/22* (2013.01); *G02B 6/4486* (2013.01); *H01B 7/14* (2013.01); *H01B 13/26* (2013.01);
(Continued)

(58) Field of Classification Search
CPC .................................................. H02G 15/04
(Continued)

(56) References Cited

U.S. PATENT DOCUMENTS 1,185,014 A * 5/1916 Shea .................... E04D 1/22
138/156
3,040,121 A * 6/1962 Gillemot .............. H02G 15/18
174/138 F (Continued)

FOREIGN PATENT DOCUMENTS

CN          1162823 A      10/1997
CN        202627339 U      12/2012
(Continued)

OTHER PUBLICATIONS

International Search Report PCT/EP2015/052168; Filing Date: Feb. 3, 2015; 2 pgs.
(Continued)

*Primary Examiner* — Chau N Nguyen
(74) *Attorney, Agent, or Firm* — Schmeiser, Olsen & Watts, LLP

(57) ABSTRACT

A method and to an apparatus for producing a submarine cable containing a number of conductors, in particular energy conductors and/or data conductors, that are accommodated inside a cable-protecting pipe, is provided. The following method steps being carried out: a) providing the conductors and the cable-protecting sheath and conveying the same into a common assembly region; b) bringing the conductors and the cable-protecting pipe together; c) opening the separating slit in the cable-protecting pipe such that an insertion opening of the open separating slit is formed; e) holding the open separating slit open; f) inserting the con-
(Continued)

ductors into the cable-protecting pipe through the insertion opening in the open separating slit; and g) releasing the open separating slit.

2 Claims, 4 Drawing Sheets

(51) Int. Cl.
  *H02G 1/10* (2006.01)
  *H02G 9/06* (2006.01)
  *G02B 6/44* (2006.01)
  *H01B 13/26* (2006.01)
  *H01B 7/14* (2006.01)
  *H01B 13/32* (2006.01)
(52) U.S. Cl.
  CPC .............. *H01B 13/32* (2013.01); *H02G 1/10* (2013.01); *H02G 9/065* (2013.01); *G02B 6/4427* (2013.01)
(58) Field of Classification Search
  USPC .............................................. 174/93, 113 R
  See application file for complete search history.

(56) References Cited

U.S. PATENT DOCUMENTS

| | | | | |
|---|---|---|---|---|
| 4,084,066 A * | 4/1978 | Gillemot | ................ | H02G 15/10 138/156 |
| 4,233,731 A * | 11/1980 | Clabburn | ............... | H01R 4/723 156/85 |
| 4,379,473 A * | 4/1983 | Kunze | .................... | B29C 61/10 138/103 |
| 4,413,656 A * | 11/1983 | Pithouse | ................ | B29C 61/10 138/110 |
| 4,437,789 A | 3/1984 | Kasiewicz | | |
| 4,777,072 A * | 10/1988 | Cason, Jr. | ............... | B29C 61/10 138/128 |
| 4,830,061 A * | 5/1989 | Karakawa | ............... | F16L 59/10 138/110 |
| 5,054,881 A | 10/1991 | Fisher et al. | | |
| 5,167,399 A | 12/1992 | Delomel | | |
| 5,647,358 A * | 7/1997 | Vilasi | .................... | A61M 16/04 128/207.14 |
| 6,410,848 B1 * | 6/2002 | Shrader | .................. | H01B 7/186 174/36 |
| 6,774,312 B2 * | 8/2004 | Fatato | ....................... | F16L 3/26 138/122 |
| 9,224,519 B2 * | 12/2015 | McLaughlin | ...... | H02G 15/1826 |
| 2010/0025076 A1* | 2/2010 | Pearce | ................. | H02G 3/0481 174/135 |
| 2010/0314148 A1* | 12/2010 | Temblador | ........... | H02G 3/0468 174/24 |
| 2014/0166340 A1* | 6/2014 | McLaughlin | ...... | H02G 15/1826 174/135 |

FOREIGN PATENT DOCUMENTS

| | | |
|---|---|---|
| CN | 103021585 A | 4/2013 |
| DE | 2651725 B1 | 4/1978 |
| DE | 2819484 A1 | 11/1978 |
| DE | 19927958 C2 | 1/2002 |
| DE | 102006062545 A1 | 7/2008 |
| EP | 2736306 A1 | 5/2014 |
| WO | WO 9710461 A1 | 3/1997 |

OTHER PUBLICATIONS

Translation of Chinese Office Action for Chinese Application No. 201580010218.8, dated May 17, 2017.

* cited by examiner

METHOD AND APPARATUS FOR PRODUCING A SUBMARINE CABLE, AND SUBMARINE CABLE PRODUCED THEREWITH

CROSS-REFERENCE TO RELATED APPLICATIONS

This application claims priority to PCT Application No. PCT/EP2015/052168, having a filing date of Feb. 3, 2015, based off of German application No. 102014203223.7, having a filing date of Feb. 24, 2014, the entire contents of which are hereby incorporated by reference.

FIELD OF TECHNOLOGY

The following relates to a method and to an apparatus for manufacturing a submarine cable (also referred to as an offshore cable), and to a submarine cable produced therewith, in particular for transmitting power and/or data between a wind power plant of an offshore wind power installation at sea and/or further wind power plants of the same offshore wind power installation and/or other offshore wind power installations at sea or onshore wind power installation on the mainland, optionally via electrical transformer stations.

BACKGROUND

In the prior art, submarine cables within offshore wind power installations between individual wind power plants are laid by means of so-called "cable-laying ships" on and/or in the seabed as infield submarine cable of lesser diameter, or from offshore wind power installations to the mainland as export submarine cables of larger diameter.

A submarine cable of this type, which in the radial cross section is cylindrical, for the transmission of three-phase current or high-voltage DC (HVDC) in the prior art is composed of a plurality of power conductors, in particular from copper, and/or of a plurality of data conductors, in particular from copper or glass fibers or man-made fibers, which are received in a tubular cable protection sheath (jacketing) in particular from flexible plastics or metal, and there are embedded in a watertight manner and protected against mechanical and chemical damage.

The layers of the tubular cable protection sheath, from radially outboard to radially inboard, may be configured as follows: Polyethylene tube (PET), biaxially oriented polyester film (boPET), twisted steel ropes as a tubular armor, aluminum tube as a water barrier, polycarbonate tube, copper or aluminum tube, Vaseline.

An alternative construction of the layers of the tubular cable protection sheath may be configured as follows: polypropylene ropes (PP) bitumen layer, armor, bitumen layer, embedding layer.

Of course, further constructions of the layers of the tubular cable protection sheath may also be possible, said further constructions are all to be comprised by the present invention.

The power and data conductors of the submarine cable, lie so as to be embedded in a protective manner by a casting and/or dipping procedure, for example, within the Vaseline layer or the embedding layer, respectively.

The disadvantage is that conventional offshore submarine cables due to their armor which in comparison with onshore cables is very complex have a greater weight, a larger external diameter, greater wall thicknesses, and a larger minimum bending radius. Due to more difficult handling, that is to say manufacturing, storing, transporting, and laying on/in the seabed, the offshore submarine cables are thus more cost intensive.

A further significant disadvantage is that in the case of the offshore cables long delivery times as compared with onshore cables have to be taken into account, as there are only a few (presently three) specialized manufacturers thereof.

Further disadvantages are the comparatively high transmission losses due to induction between the power and data conductors and the armor, this in turn requiring a comparatively large cross-sectional area of the conductors, in particular in the case of three-phase current transmission. Thus, connection of the offshore cables within the conversion pieces to other offshore or onshore cables or to transformer stations is also associated with higher costs.

SUMMARY

An aspect relates to a method and an apparatus for producing a submarine cable of the generic type in such a manner that the latter is simpler and more cost-effective in manufacturing and optionally in laying at sea.

A submarine cable of the generic type contains a number of in particular electrical and/or optical conductors comprising power conductors, in particular from copper, and/or data conductors, in particular from copper or glass fibers or man-made fibers, which are received within a cable protection tube, in particular from plastics, which in particular is flexible at least in portions, and there are embedded in a sealed/watertight manner, so as to be protected against mechanical, physical, and chemical damage.

The method according to the invention for manufacturing a submarine cable of this type, according to patent claim 1, contains the following steps:

1a) providing the conductors and the cable protection sheath, and conveying into a common assembly region;

1b) gathering the conductors and the cable protection tube in a common gathering region, while in particular continuously conveying the conductors and the cable protection tube in the same conveying direction;

1c) optionally and in particular continuously slitting the jacket of the cable protection tube in the longitudinal direction in an opening region such that a separation slot is formed in the cable protection tube, which extends through the entire wall thickness of the jacket and across at least part of the length of the cable protection tube; alternatively, a longitudinally running separation slot may already be present in the jacket of the cable protection tube, prior to the cable protection tube being conveyed into the assembly region; this separation slot here may be incorporated into the jacket of the cable protection tube outside the assembly region, by the manufacturer of the cable protection tube or of the ready made-up submarine cable, prior to step 1a), or may be integrated already during manufacturing;

1d) opening, in particularly bending open, the separation slot running in the longitudinal direction of the cable protection tube, in particular in the radial direction about the circumference, in the direction of the cross section, so as to be transverse or oblique at an angle to the longitudinal extent of the opened separation slot in the opening region, at least until an introduction opening of the opened separation slot is formed for the conductors;

1e) retaining the opened separation slot in a retaining region;

1f) introducing the conductors into the cable protection tube, in particular in a continuous collective manner, a partially collective manner, or in a temporally sequenced manner, through the introduction opening of the opened separation slot in an introduction region;

1g) releasing the retention of the opened separation slot in a closing region such that downstream thereof two longitudinal edges of the separation slot overlap and in this way two overlapping strip-shaped angular jacket regions are formed in an overlapping region, therein forming at least double the jacket wall thickness of the cable protection tube;

1h) optionally closing the opened separation slot, in particular by overlapping or folding over, respectively, in an overlapping region of angular jacket strips of the cable protection tube on both sides of the separation slot in the closing region, in particular by means of lateral oblique guide rollers; alternatively, closing of the opened separation slot may also be performed in such a manner that both longitudinal edges of the separation slot are mutually abutting, optionally being flush with one another and optionally being in mutual contact; alternatively closing of the opened separation slot may also be performed in such a manner that a flexible closure tape is received in particular in a clamping manner between the two longitudinal edges of the separation slot; arbitrary combinations of the abovementioned variants in sequence are also possible The apparatus according to the invention for manufacturing a submarine cable, according to patent claim 7, contains respective installations for carrying out method steps 1a) to 1h) mentioned here above.

The inventive submarine cable according to patent claim 11 corresponds to a submarine cable of the generic type and is distinguished therefrom in that two angular jacket strips of the cable protection tube that are located in an overlapping region and preferably run in the longitudinal direction mutually overlap, and/or the two longitudinal edges of the separation slot mutually abut, and/or the two longitudinal edges of the separation slot therebetween receive in particular in a clamping manner a closure tape. The respective connection regions of the three variants described here above are in particular sealed/watertight so as to be protected against mechanical, physical, or chemical damage, and/or are in particular unreleasably interconnected.

Alternatively, the cable protection tube, therefore, may be closed using an H-shaped closure tape, for example, wherein angular jacket strips of the cable protection tube engage in grooves of the H-shaped closure tape, closing the separation slot. The H-shaped closure tape here may be composed of segments or be utilized off a roll and be inserted in a continuous manner. Incorporating a glue, an adhesive, or another jointing material such as, for example, silicone, is also conceivable here. In one further alternative assembly, the cable protection tube may also be closed and sealed by way of a welding procedure.

The conductors of the submarine cable according to the invention are protected against water in particular by an aluminum sheath between an external rubber sheath and the conductor. Furthermore, the intrusion of water into the cable protection tube permits particularly good cooling of the conductor cables, enabling lower resistance losses and more power on the conductor cable.

This offshore cable according to the invention, and the manufacturing method therefor, are advantageous because both are very cost-effective. Therewith, standard components may be joined together directly on an installation ship (cable-laying ship), so as to form the offshore cable according to the invention, whereas the prior art requires laborious installation in a factory, having problems in storing, transporting, and provisioning for laying on the ship. Furthermore, there are many manufacturers of the standard components of the invention, whereas there are only a few suppliers of offshore cables of the prior art, the latter moreover being expensive. Further advantages of the offshore cables according to the invention are that comparatively small cable-laying ships, or even simple ships having sufficient space on the ship deck, may be employed, making laying of the offshore cables even more cost-effective. Instant delivery (on-time delivery) of all cables is possible since the individual cables and the cable protection tubes (in particular from HDPE (high density polyethylene) plastics) are standard components of the trade.

Further and particularly advantageous design embodiments and refinements of the invention are derived from the dependent claims and from the description hereunder. The dependent claims and the description hereunder contain particularly advantageous refinements and design embodiments of the invention, wherein in particular the claims in one category may also be refined in a manner analogous to the dependent claims in another claims category. Likewise, the features of different variants of embodiment may be combined.

Optional slitting of the cable protection tube in step 1c) is performed by mechanical and/or physical and/or chemical separation. In particular, slitting is performed by non-chipping separation in particular by means of a knife, a blade, scissors, which may optionally be electrically heatable. Alternatively, slitting may be performed by chip-removing separation, in particular by means of punching or milling, and/or by liquid-blasting or particle-blasting, in particular by means of water-blasting or sand-blasting. However, slitting by means of a knife or a blade fixedly standing on an apparatus, with the cable protection tube being moved in relation thereto in the conveying direction, is the simplest and most cost-effective. The conveying speed here is adapted to the material of the cable protection tube (for example, HDPE plastics).

Bending open the separation slot in step 1d) is performed in particular by the effect of force of at least one wedge which also may take care of retaining the opened separation slot in step 1e), additionally or alternatively to at least one guide roller. Here, the wedges and guide rollers by way of the introduction opening engage in the interior of the opened cable protection tube, allowing the edges of the opened jacket of the opened cable protection tube to slide there onto while the cable protection tube is being conveyed.

Introducing all electrical and/or optical conductors into the cable protection tube in step 1f) is performed in a preferably collective manner, all conductors and the cable protection tube having approximately the same conveying speed. Very rapid introduction of the conductors into the cable protection tube is thus possible. However, in one other embodiment, the conductors may also be incorporated into the cable protection tube in a temporally offset manner, for example when the introduction opening cannot be selected so as to be sufficiently large, for example due to excessively low elasticity of the material of the cable protection tube. Optionally, a flexible closure tape which in the cross section is of I, L, Z, T, or H shape, is introduced at least into the separation slot of the cable protection tube after the conductors have been incorporated into the cable protection tube.

Optional closing of the opened separation slot, according to step 1h), is initially performed by way of the inherent elasticity of the cable protection tube once the influence of force by the installation for retention (wedge and/or internal guide rollers) is withdrawn, this arising by virtue of the continuing conveyance of the cable protection tube. This inherent elasticity of the cable protection tube however typically does not cause complete closing of the separation slot of the cable protection tube, optionally having an elastic closure tape jammed therebetween, or causes only closing in a mutually abutting manner. In order to achieve even more improved protection of the conductors received therein, active folding over on top of one another of the two longitudinal edges of the separation slot of the cable protection tube may be performed, in particular by means of lateral oblique guide rollers. Lateral guide rollers which are anyway required at this point are replaced by these lateral oblique guide rollers, making the apparatus more cost-effective. This folding over of the two longitudinal edges of the separation slot of the cable protection tube may also be performed by other installations, for example by applying the force of tappets or of eccentric cams to one or to both sides of the cable protection tube, counter bearings then being required, however, for example lateral guide rollers having a vertical rotation axis. However, these lateral counter bearings for the tappets or eccentric cams may also be omitted in the case of the latter acting from above onto the two longitudinal edges of the separation slot of the cable protection tube.

In temporal terms before and/or during step 1f), and/or in temporal terms during and/or after step 1g), and/or in temporal terms between step 1f) and step 1g), a conventional sealing/watertight embedding layer/casting compound, in particular bitumen and/or plastics, is filled into the intermediate space between the cable protection tube and the conductors located therein.

This sealing embedding layer/casting compound may also be filled into the intermediate space between the two mutually overlapping angular jacket strips of the cable protection tube in the overlapping region, said angular jacket strips thus being unreleasably interconnected in a sealing/watertight manner. Alternatively, the two angular jacket strips may also be interconnected in a sealing manner by means of other types of connections, such as, for example, by adhesive bonding, vulcanizing, thermal connecting, welding, soldering/brazing.

In one alternative embodiment of the present invention, the two longitudinal edges of the separation slot of the cable protection tube, in a mutually abutting contacting or non-contacting position of the two mutually adjacent longitudinal edges that at an end side is mutually flush, are interconnected by welding and/or by adhesive bonding, in particular in the longitudinal direction, by way of this weld and/or adhesive bond being preferably also sealed in relation to the water pressure in the installation depth of the sea. Therefore, continuous adhesive bonding or welding of the cable protection tube in the longitudinal direction is preferably performed.

In one alternative embodiment of the present invention, the two longitudinal edges of the separation slot of the cable protection tube, in a mutually abutting non-contacting position of the two mutually adjacent longitudinal edges that at the end side is mutually flush, are interconnected by an in particular flexible closure tape which in the cross section is in particular of I, L, Z, T, or H shape and which is introduced into the separation slot, by way of this closure tape being preferably also sealed in relation to the water pressure in the installation depth of the sea. To this end, the closure tape which is introduced into the separation slot is preferably adhesively bonded and/or welded to the cable protection tube. Adhesive bonding does not mandatorily have to run across the entire cross section of the closure tape, but may also be performed only in portions. However, it is preferable here for continuous adhesive bonding or welding of the closure tape in the longitudinal direction of the closure tape or of the cable protection tube, respectively, to be performed. The closure tape here is configured so as to be flexible, and is in particular from a plastics material, preferably from the same plastics as the cable protection tube, for example from HDPE plastics.

The apparatus according to embodiments of the invention as a provisioning installation for providing the conductors and the cable protection tube preferably contains conventional winding reels or cable drums, respectively, having a horizontal or vertical axis. Even very long submarine cables may be manufactured in a simple and cost-effective manner herewith in that the conductors and cable protection tubes each are wound onto an assigned winding reel or cable drum, respectively, and are transported onto the cable-laying ship so as during the laying procedure to be unwound, made up, and laid in the sea. In this way it is possible for a plurality of comparatively short conductors to be installed in sequence in a common cable protection tube, and to be interconnected by way of electrically and/or optically conducting and optionally sealing conductor connections. Here, the conductors, particularly at the end pieces thereof, are welded using aluminum, thus forming a continuously conducting connection. The welding points are sealed using plastics. Furthermore, the welded connections in the longitudinal direction are disposed so as to be offset, so as to avoid excessive thickening at any point. A conductor connection here has an external diameter which is, for example, double the size of a conductor per se. Hence it is advantageous for the conductor connections of conductors which are installed in parallel to come to lie so as to be mutually offset in the longitudinal direction, as this allows the cable protection tube to be selected so as to be of a comparatively small diameter, because the plurality of conductor connections of parallel conductors cannot be mutually obstructive in this manner once the cable protection tube closes or is closed, respectively. On account thereof, many comparatively short lengths of conductors or of cable protection tubes, respectively, may be joined to form a very long submarine cable (of hundreds or of thousands of kilometers), so as to be installed in the sea. In this way, the winding reels or cable drums, respectively, may also be of comparatively small dimensions, selecting instead a larger number thereof in order to bridge the distance to be laid with one submarine cable. This leads to lower transportation costs since conventional transport vehicles may be employed, rendering special vehicles unnecessary.

Actively drivable drives, in particular in the form of conveyor belts, and passively drivable/conjointly running lateral and upper guide rolls, in particular in the form of vertical or horizontal cylinders may be present on a ladder-shaped or chain-shaped main frame as conveying and gathering installation for conveying and gathering the conductors and the cable protection tube, and the completely made-up submarine cable. The vertical cylinders of the guide rollers, in the central jacket region thereof, may have concave recesses in which the cable protection tube may then engage and thus be laterally guided and/or driven. Here, the lateral guide rollers, in particular in pairs, are attached to the main frame, in order for the cable protection tube to be able to be uniformly guided on the left and the right of the conveying direction. By contrast, the upper guide rollers as counter bearings have the actively drivable conveyor belts.

Of course, each of the lateral and/or upper guide rollers may likewise be actively drivable. The actively drivable conveyor belts may also be omitted, lower guide rollers similar to the upper guide rollers being present instead, the active drive in this instance being disposed outside the frame of the apparatus, for example. Also, all passive guide rollers which are conjointly driven may also be embodied so as to be locationally fixed, having only a minor coefficient of friction at least on that surface that faces the cable protection tube, such that the cable protection tube may glide in a guided manner along these smooth surfaces of the guide rollers which are fixed on the main frame, for example.

The optional slitting installation for slitting the jacket of the cable protection tube contains a number of knives, blades, or movable scissors, punches, milling cutters, water blasting or sand blasting installations which are fixed to the main frame. However, fixed knives and blades are particularly suitable for slitting a cable protection tube, and are moreover very cost-effective.

The opening installation for opening, in particular for bending open, the separation slot contains at least one in particularly fixed wedge which optionally supports the installation for slitting the jacket of the cable protection tube. As an alternative to the wedge, a pin, a cam lobe, or a fixed or a passively rotatable or actively rotating roller or roll may be employed, in a similar manner to the lateral or the upper guide rollers.

The retention installation for retaining the opened separation slot preferably contains a number of in particular fixed wedges and/or a number of in particular locationally fixed actively and/or passively drivable guide rollers, similar to the lateral or the upper guide rollers. Guide rollers similar to the lateral or the upper guide rollers may also be used instead of the wedges.

The optional closing installation for closing the opened separation slot may contain a number of in particular locationally fixed actively and/or passively drivable oblique guide rollers which may also be replaced by pins or cam lobes, etc. In one preferred variant, the submarine cable according to the invention is characterized in that either the two mutually overlapping angular jacket strips of the cable protection tube that run in the longitudinal direction bear on one another, and/or the radial intermediate space between the two mutually overlapping angular jacket strips of the cable protection tube that run in the longitudinal direction are filled with the sealing/watertight casting compound.

The submarine cable preferably has the following dimensions: the diameter of the cable protection tube after step 1f) is between 50% and 99%, in particular between 60% and 90%, most particularly between 70% and 80% of the original diameter of the cable protection tube prior to/during step 1a). At the same time, or alternatively, the overlapping angular jacket region of the cable protection tube is between 1° and 180°, in particular between 10° and 90°, most particularly between 30° and 45°.

For the further embodiment in the case of which the separation slot of the cable protection tube is closed in a mutually abutting manner, the diameter of the cable protection tube after step 1f) is of course approx. 100% of the diameter of the cable protection tube prior to/during step 1a), or somewhat thereabove or therebelow.

For the further embodiment in the case of which the separation slot of the cable protection tube is closed by way of a connection tape which is inserted there, the diameter of the cable protection tube after step 1f) is of course more than 100% of the diameter of the cable protection tube prior to/during step 1a), for example between 101% and 110%, depending on the cross section of the connection tape.

In particular, the cable protection tube is formed from high-density polyethylene (HDPE), in particular having a density equal to or more than 0.94 $g/cm^3$ and equal to or less than 0.97 $g/cm^3$, this being readily processable, stable, flexible, and nevertheless cost-effective. However, other plastics materials are likewise possible.

It is particularly advantageous for the method according to the invention, and/or the apparatus according to the invention, and/or the completely made-up submarine cable to be located on a cable-laying ship, such that in this way the conductors and the cable protection tube may be kept available individually, and the completely made-up submarine cable may be laid at sea or on or in the seabed respectively, without intermediate storage on the cable-laying ship, optionally using a tension-relief reserve.

BRIEF DESCRIPTION

Some of the embodiments will be described in detail, with reference to the following figures, wherein like designations denote like members, wherein.

DETAILED DESCRIPTION

Figure 1:
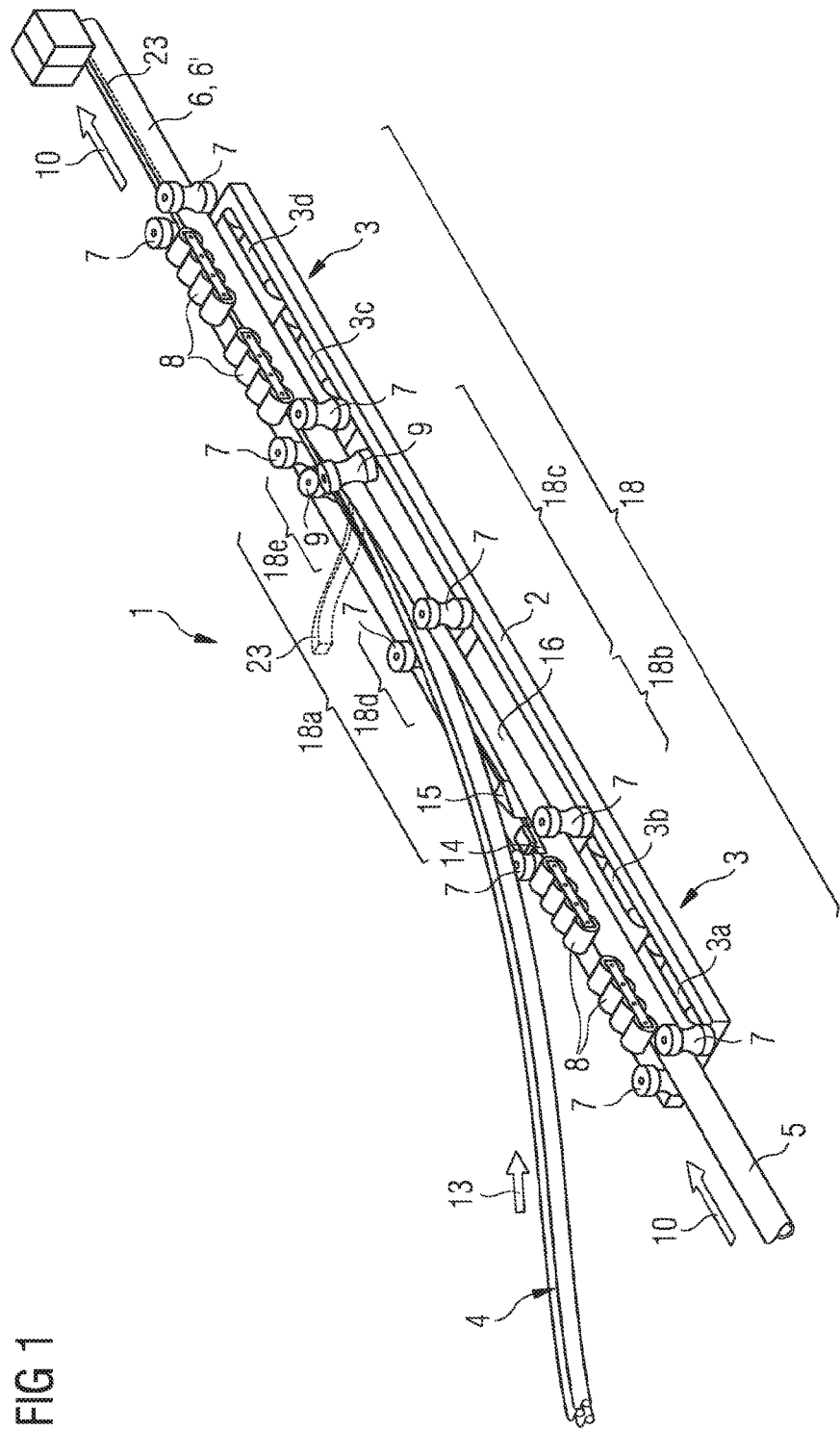
FIG. 1 shows a schematic perspective overall illustration of the apparatus according to an embodiment the invention for manufacturing the submarine cable.

FIG. 1 shows the apparatus 1 according to the invention for manufacturing the completely made-up submarine cable 2 according to the invention, which is located on a cable-laying ship (not illustrated), for example.

The apparatus 1 according to the invention contains a ladder-shaped main frame 2 which defines an assembly region 18. Two active drives 3 in the form of in each case two conveyor belts 3a and 3b, and 3c and 3d, respectively, are located on this main frame 2, so as to be disposed on the end sides, said conveyor belts providing conveyance of the conductors 4 and of the cable protection tube 5, which are being fed into the apparatus 1, and of the completely made-up submarine cable 6, 6' which is exiting from the apparatus 1. Here, the cable protection tube 5 bears on the conveyor belts 3a, 3b, 3c, 3d, which effect actual transportation of the cable protection tube 5, conjointly with the conductors 4 being located therein, in the conveying direction 10. Furthermore, lateral guide rollers 7 which in pairs are disposed to the left and to the right of the cable protection tube 5, are present on the main frame 2, as well as upper guide rollers 8 which press onto the cable protection tube 5 optionally by way of spring loading being present, which provide lateral guiding of the cable protection tube 5, or provide friction-locking bearing of the cable protection tube 5 on the conveyor belts 3*a*, 3*b*, 3*c*, 3*d* in the assembly region 18.

Finally, the rotation axes of two oblique guide rollers 9 which are mutually assigned in pairs to the left and to the right of the cable protection tube 5, are aligned in the example here so as not to be perpendicular to the vertical, but so as to be oblique thereto at an angle of approx. 35° to 45° in the direction of the cable protection tube 5. These two lateral oblique guide rollers 9 in the closing region 18*e* are disposed in the conveying direction 10 so as to be downstream, locationally behind the introduction of the conductors 4 into the cable protection tube 5 such that compressing the previously opened longitudinal edges 11 (cf. FIG. 3) of the separation slot 12 (cf. FIG. 2) of the cable protection tube 5 may be performed therewith.

The presently three pieces of electrical conductors 4, and an optical conductor 4 (obscured and therefore not visible in this FIG.), and the associated cable protection tube 5, from accumulators, for example winding reels (not illustrated here) of the apparatus 1 are conveyed in the conveying direction 10 by means of lower active drives 3 having front and rear conveyor belts 3*a*, 3*b*, 3*c*, 3*d*, and passive conjointly running lateral upper and lateral oblique guide rollers 7, 8, 9 into the gathering region 18*a* in which the conductors 4 are placed into the opened cable protection tube 5, so as to be subsequently conveyed out of the apparatus 1 as a closed and completely made-up submarine cable 6, 6', onto an accumulator, for example a winding reel (not illustrated), or else to be laid directly without intermediate storage on or in the seabed.

Figure 4:
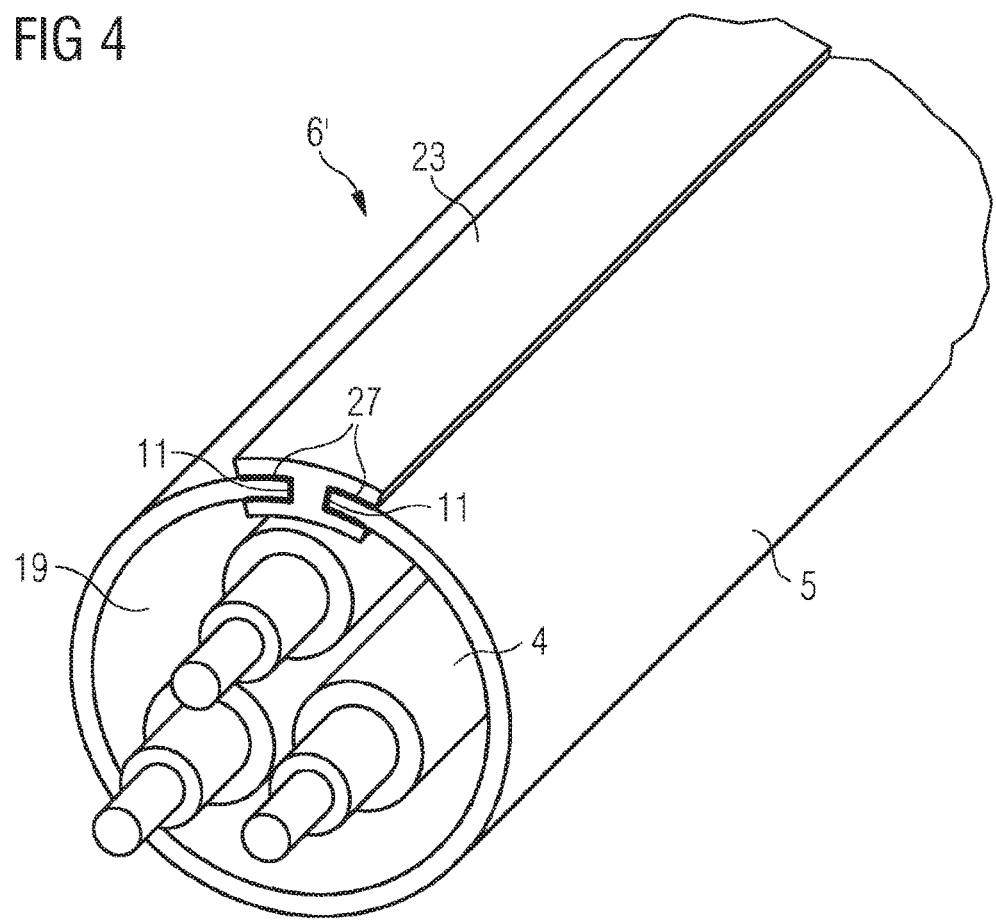
FIG. 4 shows a schematic perspective partial view of the completely made-up submarine cable, in a second embodiment having an H-shaped closure tape.

The alternative and completely made-up submarine cable 6', in a second embodiment according to FIG. 4, is additionally illustrated in FIG. 1. It can be seen that a closure tape 23, which is indicated with dashed lines, at the beginning of the closing region 18*e* of the cable protection tube 5 is incorporated in the separation slot 12 (cf. FIG. 2) between the two longitudinal edges 11 (cf. FIG. 2) of the cable protection tube 5. Further details of this closure tape 23 have already been mentioned in the general specification and will be described in more detail hereunder in the context of FIGS. 4 and 5.

Figure 2:
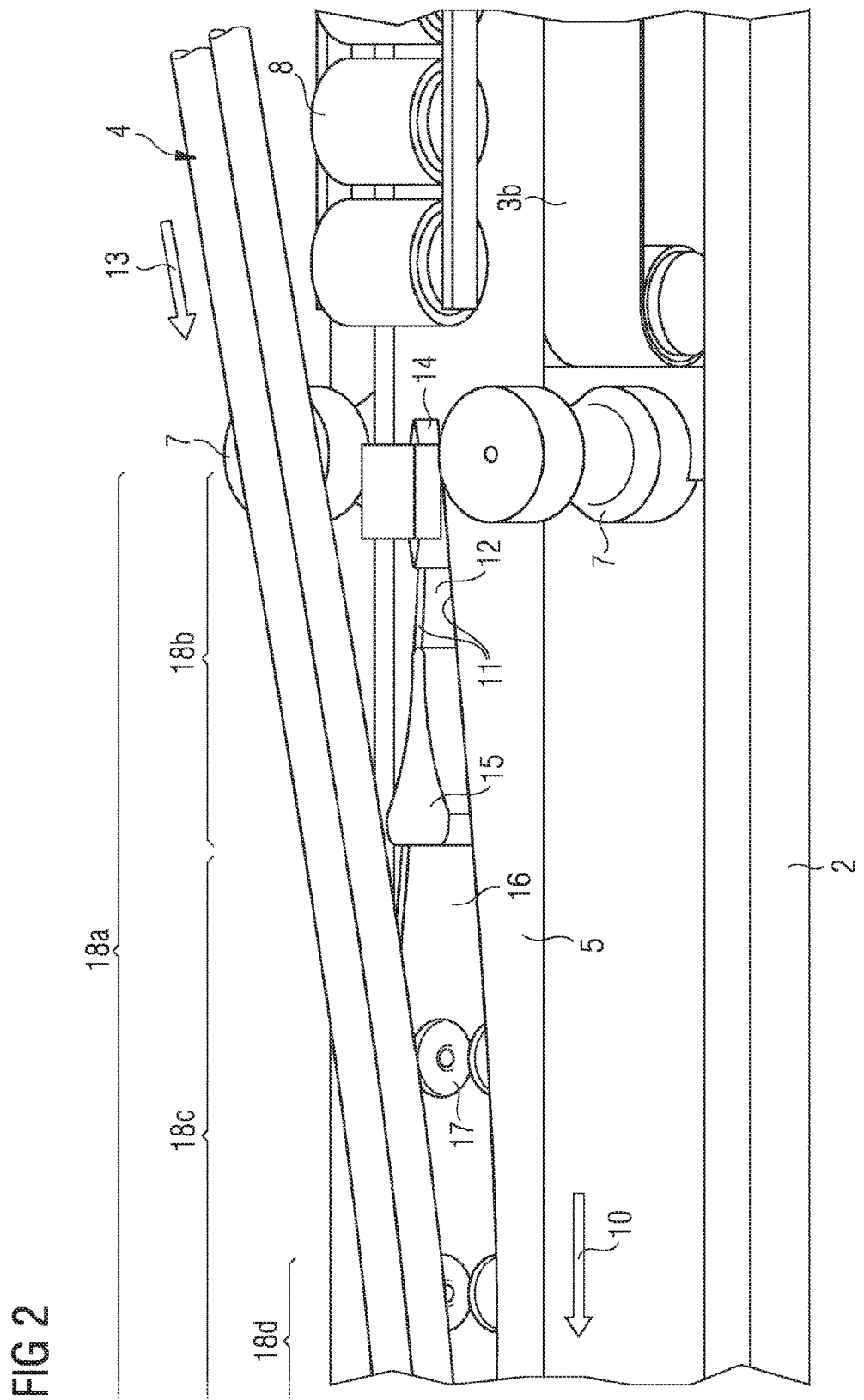
FIG. 2 shows a schematic perspective enlarged illustration of a detail of the apparatus according to an embodiment of the invention for manufacturing the submarine cable, in the region of the opening and retaining installation of the cable protection tube of the submarine cable.

FIG. 2 shows an enlarged illustration of a detail of the apparatus 1 according to the invention, in the opening region 18*b* and the retention region 18*c* of the cable protection tube 5 of the submarine cable 6, 6' according to the invention. The conductors 4 are introduced from above into the introduction region 18*d* into introduction opening 16 of the cable protection tube 5 in the conveying direction 13. In order for the cable protection tube 5 to be opened, a knife 14 is disposed in the upper region of the jacket of the cable protection tube 5, so as to be downstream in conveying direction 10 of the conveyor belt 3*b*, the knife 14 cutting open the cable protection tube 5, thus forming the separation slot 12 having two mutually opposite longitudinal edges 11 on the cable protection tube 5.

In order for the cable protection tube 5 to be retained open, a wedge 15 is located so as to be downstream of the knife 14 in the conveying direction 10, the wedge 15 retaining the separation slot 12 by bearing on the two mutually opposite longitudinal edges 11 of the cable protection tube 5.

The separation slot 12 is retained open by the wedge 15 until the conductors 4 in the conveying direction 13 by way of the introduction opening 16 have been completely introduced into the interior of the cable protection tube 5.

The four internal guide rollers 17 in the interior 16 of the cable protection tube 5 serve for holding down and optionally retaining the opened cable protection tube 5, and optionally for spacing the conductors 4 from the base of the cable protection tube 5 in the region where the cable protection tube 5 is opened and retained.

Figure 3:
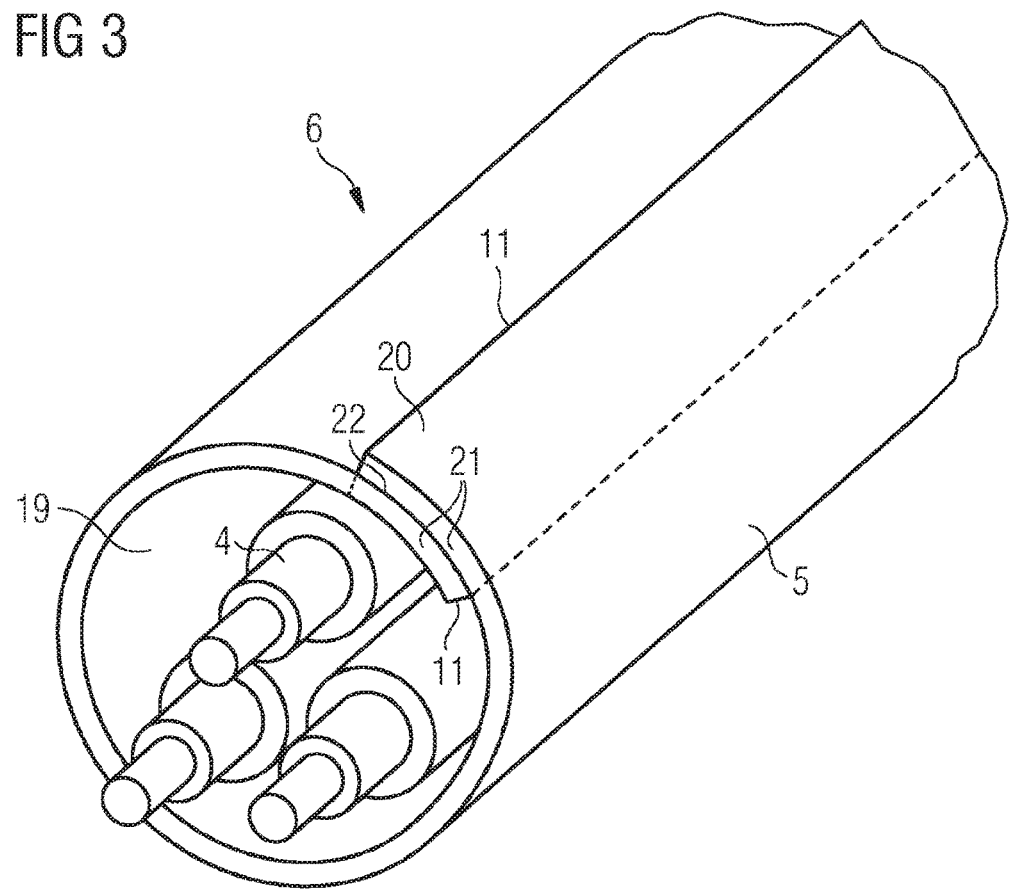
FIG. 3 shows a schematic perspective partial view of the completely made-up submarine cable, in a first embodiment.

FIG. 3 now shows the completely made-up submarine cable 6 according to the invention, in a first embodiment having a slotted cable protection tube 5, in which the electrical and/or optical conductors 4 are received within an optional embedding layer 19.

It can readily be seen that the two longitudinal edges 11 of the cable protection tube 5 in the circumferential direction are pushed on top of one another, thus defining an overlapping region 20 between the two angular jacket strips 21 of the cable protection tube 5 that extends in the circumferential direction and the longitudinal direction (corresponding to the conveying direction 10 in FIGS. 1 and 2).

Therefore, the diameter of the cable protection tube 5 prior to slitting is larger than the diameter of the cable protection tube 5 after closing.

In this instance, an overlapping space 22 into which the embedding layer or another connection and sealing compound may then be incorporated is formed between the two angular jacket strips 21. Of course, the two angular jacket strips 21, alternatively or additionally, may also be welded together from the outside.

FIG. 4 shows the completely made-up submarine cable 6' according to the invention, in a second embodiment having a flexible H-shaped closure tape 23 which, in particular in a clamping manner, is incorporated in the separation slot 12 between the two longitudinal edges 11 of the cable protection tube 5, in particular across the entire length of the cable protection tube 5, being adhesively bonded therein by way of an adhesive layer 27.

Figure 5:
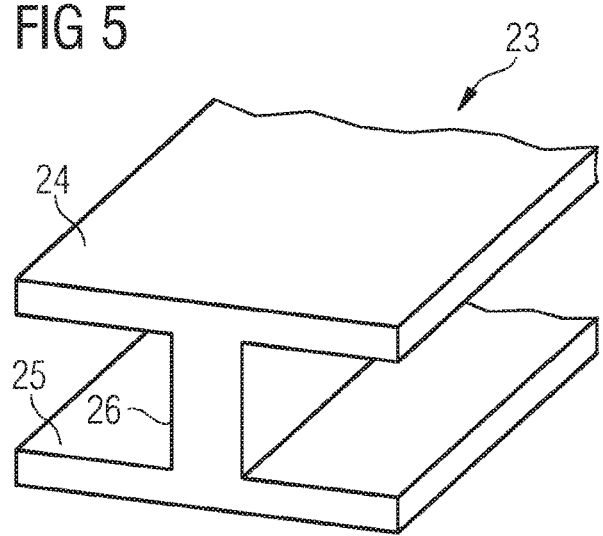
FIG. 5 shows a schematic perspective partial view of an embodiment of a H-shaped closure tape according to FIG. 4.

FIG. 5 shows the H-shaped closure tape 23 as per FIG. 4, wherein the two parallel legs 24, 25 are chosen to be longer than the intermediate web 26 which connects the former. The dimensions of the two parallel legs 24, 25 and of the intermediate web 26 depend on the diameter and on the wall thickness of the cable protection tube 5, on the thickness and area of the adhesive layer 27 (FIG. 4), and on the adhesive force of the adhesive of the adhesive layer 27 (FIG. 4).

It can be seen in FIG. 4 that the closure tape 23 is incorporated into the separation slot 12 of the cable protection tube 5 in such a manner that the two parallel legs 24 of the closure tape 23 run in the circumferential direction of the cable protection tube 5, being attached to the jacket of the cable protection tube 5, and that the intermediate web 26 of the closure tape 23 runs in the radial direction of the cable protection tube 5, being applied between the surfaces of the two longitudinal edges 11 of the cable protection tube 5, optionally under a slight circumferential clamping force.

Finally, it is pointed out once more that the methods as have been described in detail here above, and the apparatus illustrated, are merely exemplary embodiments which may be modified in various ways by a person skilled in art without departing from the scope of the invention. Furthermore, the use of the indefinite article "a" does not preclude the respective features being present in multiples. Likewise, the term "unit" and "module" does not preclude the respective components being composed of a plurality of interacting part-components which optionally may also be distributed in terms of space.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A submarine cable containing a plurality of conductors comprising power conductors and/or data conductors which are received within a cable protection tube and are protectively embedded therein, wherein two longitudinal edges of a separation slot of the cable protection tube therebetween receive in a clamping manner a flexible closure tape, the flexible closure tape contacting both of the two longitudinal edges and a surface of the cable protection tube adjacent to the two longitudinal edges, the flexible enclosure tape spanning at least an entire distance between the two longitudinal edges; wherein the plurality of conductors and the cable protection tube are conveyed into a common assembly region, and the plurality of conductors are introduced into the cable protection tube through the separation slot;

wherein the flexible closure tape includes two straight parallel legs and an intermediate web section, the intermediate web section connecting the two parallel legs;

wherein the two longitudinal edges of a separation slot of the cable protection tube, having the closure tape lying therebetween, are interconnected in a sealing/watertight manner by way of an adhesive layer.

2. The submarine cable as claimed in claim 1, wherein the two parallel legs run in a circumferential direction of the cable protection tube, and the intermediate web section runs in a radial direction of the cable protection tube.

* * * * *